(12) United States Patent
D'Angelo et al.

(10) Patent No.: US 9,846,231 B2
(45) Date of Patent: Dec. 19, 2017

(54) WEARABLE OBSTACLE-DETECTION DEVICE, AND CORRESPONDING METHOD AND COMPUTER PROGRAM PRODUCT

(71) Applicant: STMICROELECTRONICS S.R.L., Agrate Brianza (IT)

(72) Inventors: Francesco D'Angelo, Giussago (IT); Stefano Corona, Borgarello (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 244 days.

(21) Appl. No.: 14/788,029

(22) Filed: Jun. 30, 2015

(65) Prior Publication Data

US 2016/0025854 A1   Jan. 28, 2016

(30) Foreign Application Priority Data

Jul. 25, 2014 (IT) .............................. TO2014A0595

(51) Int. Cl.
 *G01S 15/12* (2006.01)
 *G01S 15/93* (2006.01)
 (Continued)

(52) U.S. Cl.
 CPC .............. *G01S 15/12* (2013.01); *G01S 7/521* (2013.01); *G01S 7/523* (2013.01); *G01S 15/025* (2013.01);
 (Continued)

(58) Field of Classification Search
 CPC .......... G01S 15/93; G01S 7/521; G01S 15/10; G01S 7/523; G01S 7/529; G01S 15/025; G01S 15/12; G10K 11/004
 See application file for complete search history.

(56) References Cited

U.S. PATENT DOCUMENTS 4,761,770 A * 8/1988 Kim ........................ G01S 15/04
  367/116
4,975,889 A * 12/1990 Petrucelli ................ G01S 7/527
  367/98
(Continued)

FOREIGN PATENT DOCUMENTS

CN       103431979 A   12/2013
CN       203619859 U    6/2014
(Continued)

OTHER PUBLICATIONS

Translation of CN203619859.*

*Primary Examiner* — Daniel Pihulic
(74) *Attorney, Agent, or Firm* — Seed IP Law Group LLP (57) ABSTRACT

A device for detecting obstacles that is wearable by a subject, for example integrated in an item of footwear. The device includes an ultrasound source for emitting an ultrasound transmission signal and an ultrasound receiver for receiving a corresponding ultrasound signal reflected by an obstacle, a control module for measuring a time of flight between emission of the ultrasound transmission signal and reception of the corresponding ultrasound signal reflected by the obstacle and calculating, on the basis of the aforesaid time of flight, the distance at which the obstacle is located. The device comprises an inertial sensor, in particular an acceleration sensor, designed to measure acceleration of the foot along three axes, and a control module configured for enabling operation of the ultrasound source if the aforesaid acceleration values measured by the inertial sensor respect a given condition for enabling measurement of the time of flight.

19 Claims, 7 Drawing Sheets

(51) Int. Cl.
*G01S 15/02* (2006.01)
*G01S 7/521* (2006.01)
*G01S 7/523* (2006.01)
*G01S 15/10* (2006.01)
*G10K 11/00* (2006.01)
*G01S 7/529* (2006.01)

(52) U.S. Cl.
CPC .............. *G01S 15/10* (2013.01); *G01S 15/93* (2013.01); *G10K 11/004* (2013.01); *G01S 7/529* (2013.01)

(56) References Cited

U.S. PATENT DOCUMENTS

| | | | |
|---|---|---|---|
| 5,341,346 A * | 8/1994 | Youlton | A61F 9/08 367/116 |
| 6,671,226 B1 * | 12/2003 | Finkel | A61H 3/061 367/116 |
| 2012/0053826 A1 | 3/2012 | Slamka | |
| 2012/0176864 A1 | 7/2012 | Karl | |
| 2016/0025854 A1 * | 1/2016 | D'Angelo | G01S 15/93 367/97 |

FOREIGN PATENT DOCUMENTS

| | | | | |
|---|---|---|---|---|
| IT | WO 2016012920 A1 * | 1/2016 | ............. | G01S 15/93 |
| NL | 1036637 | 8/2010 | | |

* cited by examiner

WEARABLE OBSTACLE-DETECTION DEVICE, AND CORRESPONDING METHOD AND COMPUTER PROGRAM PRODUCT

BACKGROUND

Technical Field

The present description relates to a device for detecting obstacles that is wearable by a subject, such as on his or her foot and integrated in an item of footwear. In one embodiment, the device includes at least one ultrasound source for emitting an ultrasound transmission signal, an ultrasound receiver for receiving a corresponding ultrasound signal reflected by an obstacle, and a control module for measuring a time of flight between emission of the ultrasound transmission signal and reception of the corresponding ultrasound signal reflected by the obstacle and calculating, on the basis of said time of flight, the distance at which said obstacle is located.

Various embodiments may be applied to detection of obstacles for people who are blind or have weak eyesight or in conditions of poor lighting.

Description of the Related Art

Known in the prior art are wearable devices integrated in an item of footwear that provide information regarding obstacles in the proximity of a subject's foot. These devices are normally used by people who are blind or have weak eyesight and my employ various detection techniques for detecting the distance of objects. One such detection technique adopts emission of ultrasound waves by ultrasound sources present on the item of footwear and reception, via ultrasound receivers, of the corresponding ultrasound waves that may be reflected by an obstacle.

A drawback of the above known devices, however, lies in the fact that it is problematical to measure precisely the distance from the obstacle during the advancement or walk on account the various orientations assumed by the direction of emission of the ultrasound signals, and detection is likely to give rise to false positives.

BRIEF SUMMARY

Various embodiments are directed to a device having the characteristics recalled in the ensuing claims. Various embodiments may also refer to a method for detecting obstacles, as well as to a computer-readable medium containing instructions for controlling a computer system (including at least one computer (e.g., a terminal in a network)) so as to co-ordinate execution of the method and may include portions of software code that are able to execute the steps of the method when the program is run on at least one computer. Reference to "at least one computer" is intended to highlight the possibility of the present disclosure to be implemented in a modular and/or distributed form. The claims form an integral part of the technical teachings provided herein in relation to the disclosure.

In various embodiments, the device may include an acceleration sensor designed to measure acceleration of the foot along three axes, and a control module configured for enabling operation of the ultrasound source if the acceleration values measured by the acceleration sensor respect a given condition.

In various embodiments, the above condition identifies a position where the foot is resting on the ground during the walk. In various embodiments, this condition includes absence of variations of acceleration.

In various embodiments, the acceleration sensor is configured for verifying the above condition and sending a signal indicating occurrence of this condition, in particular an interrupt, to the aforesaid control module, the control module being configured for enabling operation of the ultrasound source upon reception of the above signal indicating occurrence of the condition.

In various embodiments, the device comprises an alarm indicator, in particular a vibration actuator, for generating an alarm signal when an obstacle is detected within a given distance, the alarm signal in particular varying as a function of the distance of the obstacle.

In various embodiments, the time-of-flight measurement chain comprises a comparator for comparing the amplitude of the reflected ultrasound signal with a reference signal, this reference signal in particular decreasing in time, in particular according to a decreasing exponential.

In various embodiments, the device is integrated in an item of footwear and the above acceleration sensor is integrated in the sole of the item of footwear itself.

Various embodiments may also be a method for detecting obstacles via a obstacle-detection device that is wearable by a subject on his or her foot, in particular integrated in an item of footwear that can be worn by the aforesaid subject, comprising emitting ultrasounds and receiving ultrasounds for detecting an obstacle and calculating a distance thereof, the method being characterized by providing an acceleration sensor designed to measure acceleration of the foot along three axes and enabling operation of the ultrasound source if said acceleration values measured by said acceleration sensor respect a given condition.

BRIEF DESCRIPTION OF THE SEVERAL VIEWS OF THE DRAWINGS

Various embodiments will now be described, purely by way of example, with reference to the annexed drawings, in which.

DETAILED DESCRIPTION

In the ensuing description, numerous specific details are provided to enable an in-depth understanding of the embodiments provided by way of example. The embodiments may be implemented with or without specific details, or else with other methods, components, materials, etc. In other circumstances, well-known structures, materials, or operations are not illustrated or described in detail so that the aspects of the embodiments will not be obscured. Reference in the course of the present description to "an embodiment" or "one embodiment" means that a particular detail, structure, or feature described in connection with the embodiment is comprised in at least one embodiment. Hence, phrases such as "in an embodiment" or "in one embodiment" that may be present in various points of the description does not necessarily refer to one and the same embodiment. Furthermore, the peculiar details, structures, or characteristics may be combined in any convenient way in one or more embodiments.

The notation and references are provided herein only for convenience of the reader and do not define the scope or the meaning of the embodiments.

Figure 1A:
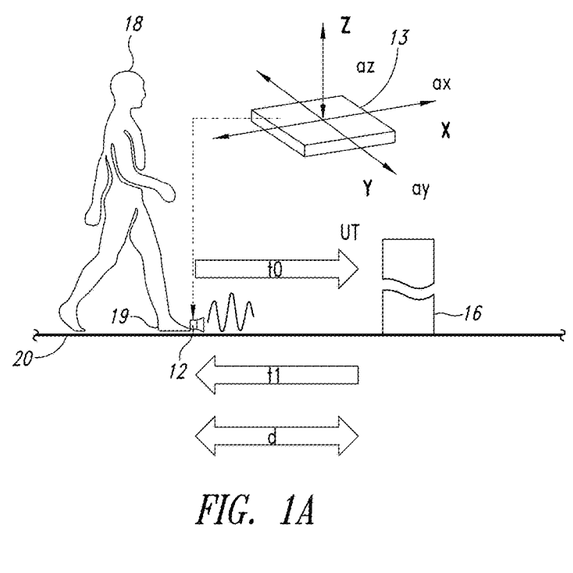
FIGS. 1A and 1B are schematic illustrations of a general embodiment of a foot-wearable device for detection of obstacles.
Figure 1B:
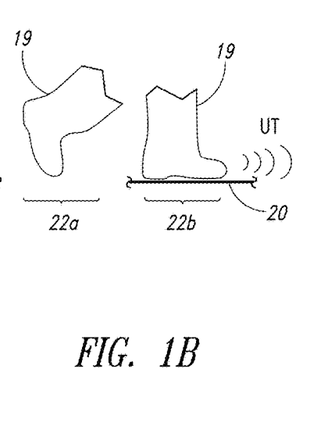

Described with reference to FIGS. 1A and 1B are the general principles of a device for detecting obstacles that is wearable by a subject on his or her foot, in particular integrated in an item of footwear.

As illustrated in FIG. 1A, a subject 18 wears on his or her foot 19 an obstacle-detection device represented in the figure through an ultrasound transducer module 12, designed to emit and receive ultrasound signals. In particular the ultrasound transducer module 12 is designed to emit an ultrasound transmission signal UT at an instant of transmission t0. The ultrasound transmission signal UT, in the case where it is reflected by an obstacle 16 as an ultrasound reflected signal UR that is received at an instant of reception t1 by the ultrasound transducer module 12 itself, in particular by a receiver included therein.

A difference of time, i.e., the time of flight, $\Delta t$ between the instant of reception t1 and the instant of transmission t0 is then calculated by the obstacle-detection device. A distance d of the obstacle 16 with respect to the foot 19 is calculated as the product of a speed v of the ultrasound waves, i.e., the speed of sound (approximately 334 m/s), and the time of flight $\Delta t$:

$$d=v\cdot\Delta t.$$

The obstacle-detection device further comprises an inertial sensor, in particular an acceleration sensor 13, in the example in question a triaxial accelerometer, designed to measure acceleration values ax, ay, az, along three orthogonal axes x, y, z, respectively, that identify a cartesian reference frame. The axes x and y lie in a plane substantially parallel or congruent to a resting surface 20 of the foot 19. In preferred embodiments, the axis x (or y) may be parallel to the longitudinal axis of the foot 19, whilst the axis y (or x) may be parallel to a transverse axis of the foot 19. The axis z is a vertical axis, i.e., perpendicular to the resting surface 20 of the foot 19. The vertical axis z, as discussed more fully in what follows, is substantially aligned with the vector of the acceleration of gravity.

As has been said, the above sensor 13 is, in the example, a MEMS (micro-Electro-Mechanical System) accelerometer, in particular an MEMS acceleration sensor LIS2DH produced by the present applicant, but in general any MEMS inertial sensor, for example a gyroscope, may perform this function in order to identify the condition of measurement.

Figure 2:
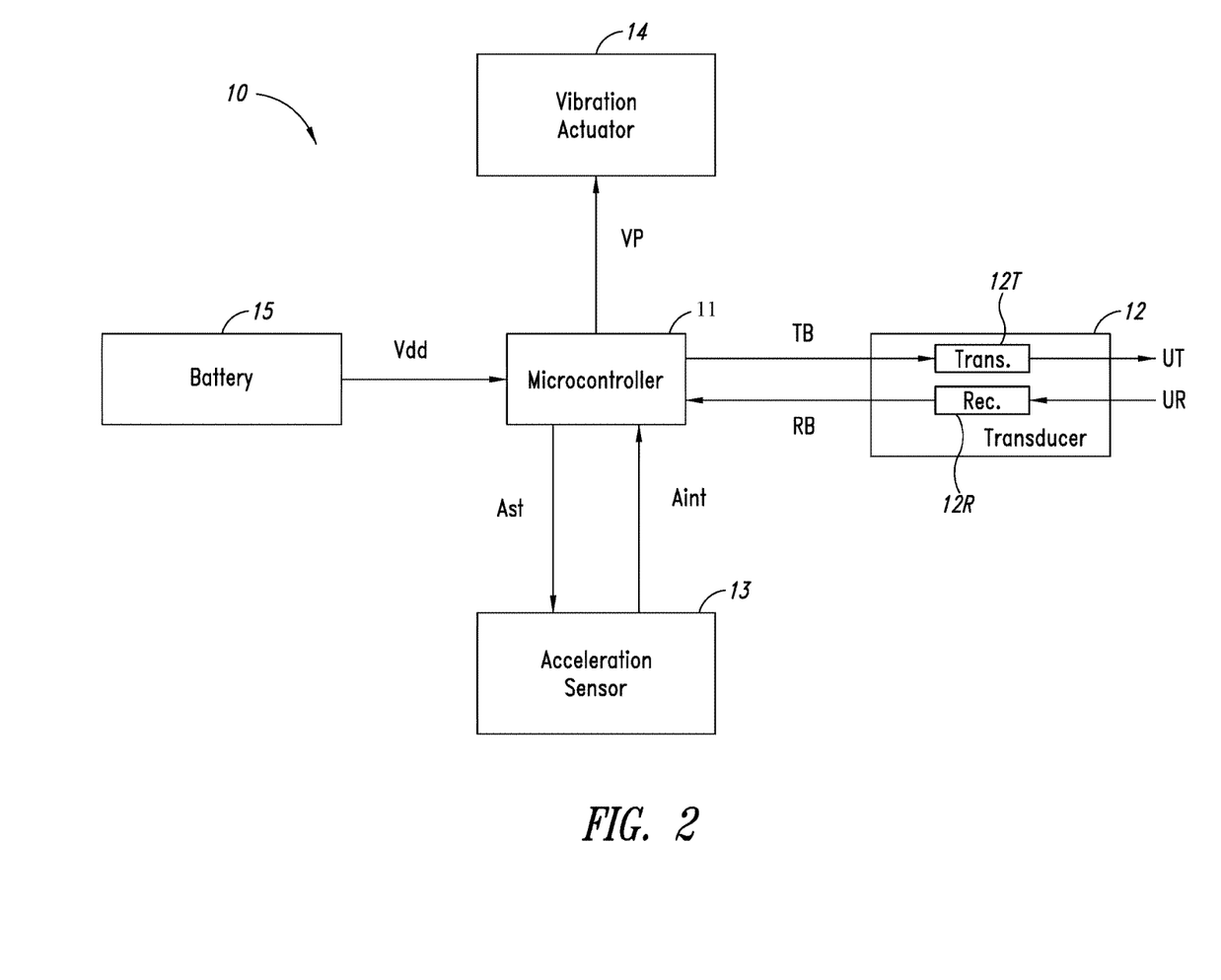
FIG. 2 shows a block diagram of a foot-wearable device for detection of obstacles.

The above acceleration sensor 13 controls, in particular through a control module, as represented in greater detail in FIG. 2, operation of the ultrasound transducer module 12, issuing a command for enabling emission and reception of ultrasound waves only if the acceleration sensor 13 measures occurrence of a specific enabling condition for the acceleration values ax, ay, az. In a preferred embodiment, as illustrated in FIG. 1B, the ultrasound transducer module 12 is enabled to operate only in a condition 22b where the foot 19 is stationary on the resting surface 20. In particular, this condition where the foot is stationary on the resting surface is identified if the longitudinal acceleration ax and the lateral acceleration ay, i.e., the accelerations in the plane of the resting surface 20, are substantially zero and the acceleration az in a vertical direction is substantially equal to the acceleration of gravity (approximately 9.8 m/s$^2$).

Instead, when the foot 19 is in a position 22a of movement between one resting position 22b and another, non-zero values of longitudinal acceleration ax and lateral acceleration ay are detected and, possibly, also values of vertical acceleration az different from the acceleration of gravity. Consequently the acceleration sensor 13 does not enable operation of the transducer module 12. The verification condition whereby it is envisaged to verify whether the variations of acceleration are zero enables the measurements to be made also on an inclined surface, for example when the subject is going uphill.

Illustrated in FIG. 2 is a block diagram of the obstacle-detection device 10 of FIG. 1.

Designated by 11 is a microcontroller, preferably a 32-bit microcontroller of the STM32 family based upon an ARM Cortex processor. This microcontroller 11 is configured for sending, through one of its own signal outputs, an excitation signal TB, i.e., an electrical signal for driving the ultrasound transducer module 12, in particular transmitting the signal TB to an ultrasound-transmitting transducer module 12T that converts the electrical signal TB at output from the microcontroller 11 into ultrasounds and emits into space the ultrasound transmission signal UT. Designated by 12R is an ultrasound-receiving transducer module comprised in the ultrasound transducer module 12, which receives the ultrasound signals UR reflected by the obstacles 16, converts them into electrical signals, in particular echo signals RB, and sends the echo signals RB to a signal input of the microcontroller 11. Moreover coupled to the microcontroller 11 is the acceleration sensor 13.

The acceleration sensor 13 issues an enabling signal Aint, depending upon the acceleration values measured, ax, ay, az, to the microcontroller 11, which enables operation of the transducer module 12 and hence operation of a measurement chain 10T, 10R, 10G, described in greater detail in what follows, which measures the times of flight and the distances for detection of the obstacles. The sensor 13 is preferably configured for verifying autonomously whether the acceleration values respect the enabling condition of the transducer module 12 and for emitting the enabling signal Aint, which is substantially an interrupt for the microcontroller 11.

In this context, the measurement condition with the foot stationary, which is a condition provided by way of example, is more specifically identified as described in what follows. The sensor 13 is programmed for generating the interrupt signal Aint, which has a given duration that can be set as described more fully hereinafter (for example 0.16 s), whenever there are no variations of acceleration along the three axes x, y, z. This operation is obtained, for example, by configuring a channel of the sensor 13, for example Interrupt1 for the sensor LIS2DH in one embodiment, to generate a signal when the accelerations measured ax, ay, az, along the three axes x, y, z do not present variations, i.e., the variations are below a threshold, for example less than 80 mg (0.785 m/s$^2$). The values of the accelerations ax, ay, az in the sensor 13, before reaching the interrupt channel, pass through a highpass digital filter, so that in the presence of continuous variations of acceleration there are always data arriving on the interrupt channel of the sensor 13. Instead, when the accelerations settle on any value (foot stable in a horizontal position for example, but also inclined, where the accelerations ax and/or ay are other than zero, but substantially constant) the highpass filter cuts the d.c. values by sending its own output to zero and causing the value thereof to drop below the threshold, in particular 80 mg, that causes triggering of the interrupt signal Aint. Hence, the condition described before for the foot in the horizontal resting position (ax, ay=0 g and az=1 g, i.e., 9.81 m/s², the corresponding variations of acceleration being substantially zero) is only one of the possible conditions valid for the measurement.

The microcontroller 11 is also configured for sending to the acceleration sensor 13 parameters Ast for setting the accelerometer. In particular, in this operation of sending setting parameters Ast, the parameters of configuration of the device are sent by entering values in specific registers. These values correspond to an encoding of bits of each register that enable given functions of the device. By way of example, with reference to the sensor LIS2DH:

Register 0×20: CTRL_REG1, value loaded 0×57, functions enabled=data rate 100 Hz, axes XYZ enabled. This enables measurement at a given data rate.

Register 0×21:CTRL_REG2, value loaded 0×81, functions enabled=HighPassFilter in Normal Mode, high pass filter enabled for AOI function on Interrupt1. Setting of this register determines highpass filtering of the data and causes the measurement emits to start only in the absence of variations of acceleration.

Register 0×22:CTRL_REG3, value loaded 0×40, functions enabled=AOI1 interrupt on INT1 pin. This sets the interrupt signal on a given pin.

Register 0×23:CTRL_REG4, value loaded 0×00, functions enabled=+/−2 g range. This sets the range of measurement.

Register 0×24:CTRL_REG5, value loaded 0×00, functions enabled=none.

Register 0×25:CTRL_REG6, value loaded 0×00, functions enabled=Interrupt active high.

Register 0×30:INT1_CFG, value loaded 0×95, functions enabled=And combination of Interrupt events, Enable interrupt generation on Z low event or on Direction recognition, Enable interrupt generation on X low event or on Direction recognition, Enable interrupt generation on Y low event or on Direction recognition.

Register 0×32:INT1_THS, value loaded 0×05, functions enabled=Interrupt1 threshold 80 mg. This sets the threshold below which the variations of acceleration are considered zero.

Register 0×33:INT1_DURATION, value loaded 0×0F, functions enabled=Interrupt1 duration value 0.16 s.

The obstacle-detection device 10 further comprises an alarm indicator, which in the example is represented by a vibration actuator 14, governed by the microcontroller 11 via sending of an alarm signal, which in the example is represented by a vibration pulse VP. The above vibration actuator 14 is activated when an obstacle is detected so that it supplies a tactile or vibrational feedback to the subject 18.

The obstacle-detection device 10 further comprises a battery 15, preferably of a Li-PO (lithium-polymer) type, which sends a supply voltage VDD to the microcontroller 11.

Figure 3:
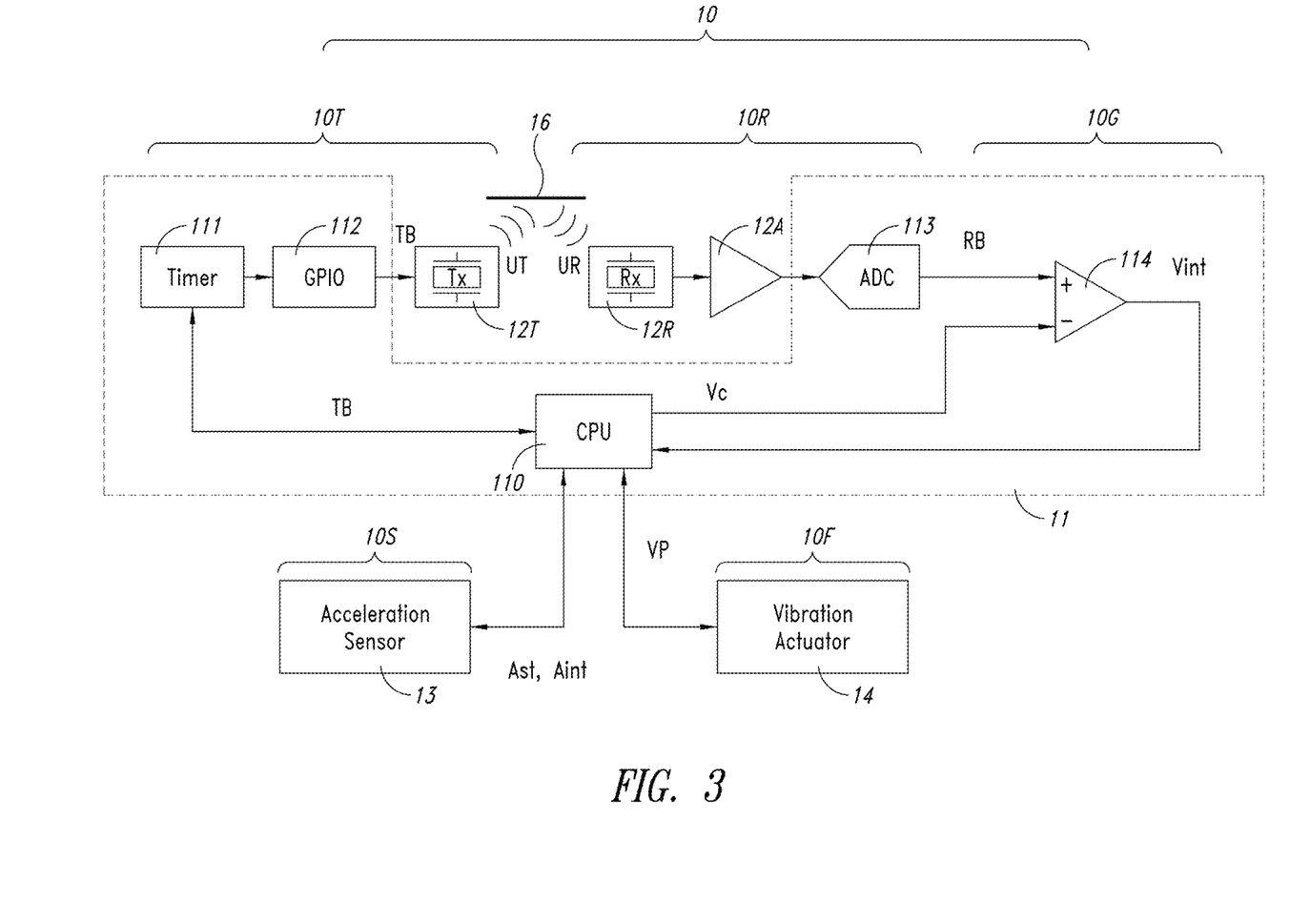
FIG. 3 shows a detail of the device of FIG. 2.

Illustrated in FIG. 3 is a block diagram that shows modules of the microcontroller 11 involved in operation of the obstacle-detection device 10. Designated by 110 is a CPU of the microcontroller 11. The CPU 110 of the microcontroller 11 enables, by sending the excitation signal TB, through a timer module 111 and a subsequent GPIO (General Purpose Input Output) interface 112 of the microcontroller 11, operation of the ultrasound-transmitting module 12T, which emits the corresponding ultrasound transmission signal UT towards the obstacle 16. The timer 111, the GPIO interface 112, and the transmitter 12T identify a transmission section 10T of the obstacle-detection device 10. The reflected ultrasound signal UR, which corresponds to a given ultrasound transmission signal UT that has been reflected by an obstacle 16, is collected by the ultrasound-receiving transducer module 12R, which transduces it into an electrical analog signal, i.e., the echo signal RB. The receiver 12R is associated to an AFE (Analog Front End) circuit 12A, i.e., a circuit for conditioning the electrical analog echo signal RB supplied by the ultrasound-receiving transducer module 12R, which is then supplied to an input provided with analog-to-digital converter 113 of the microcontroller 11, which finally generates a digital version of the echo signal RB obtained from the reflected ultrasound signal UR received. The receiving transducer module 12R, the AFE circuit 12A, and the analog-to-digital converter 113 represent a receiving section 1 OR of the obstacle-detection device 10. The above digital version of the echo signal RB, generated by the analog-to-digital converter 113, is sent to the input of a digital comparison module 114, which in the microcontroller 11 in question, STM32, is represented by the module AWD. This AWD module in the microcontroller 11 operates by comparing continuously and in an altogether transparent manner, the digital values of the echo signal RB derived from the reflected ultrasound signal UR received and converted by the analog-to-digital converter 113 and a reference signal Vc (also digital) generated by the microcontroller 11, which is received on another input of the digital comparison module 114. The reference signal Vc represents a comparison threshold for the echo signal RB. If the result of the comparison respects a given condition, in particular if the amplitude of the echo signal RB is greater than the value of the reference signal Vc, the digital comparison module 114 issues an interrupt signal Vint to the microcontroller 11. Reception of the interrupt signal Vint represents for the microcontroller 11 the effective echo; i.e., it indicates the presence of a reflected ultrasound signal of adequate amplitude. The above digital comparison module 114 in this way identifies a time-gain-compensation section 10G of the device 10. In fact, even though the digital comparison module 114 does not make a gain compensation by modifying the amplification as a function of the input signal, however, the use of a reference signal Vc as comparison threshold that, as will be described more fully in what follows, varies in time as a function of a propagation attenuation K, represents a form of gain compensation. It should in fact be considered that the gain immediately after transmission is in principle zero (high threshold of the comparator 114 and maximum attenuation of the echo signal RT) and is maximum at the end of reception (low threshold of the comparator 114 and minimum attenuation of the echo signal RT). In the framework of this idea, the gain is approximately proportional to 1/Vc, with the reference signal Vc that varies in time, as described. The values of the reference signal Vc of the comparator 114 that represent the threshold are in fact calculated in such a way that they follow the attenuation K of the ultrasound waves during propagation in the medium, i.e., in air in the case in point. It should be noted that, if the propagation medium is different (for example, water, or else sand, or grass of a height such as to interfere with the ultrasound waves), it is sufficient to change the value of the attenuation K, if not the formula that calculates the aforesaid values of the reference signal Vc that represents the threshold, to adapt the obstacle-detection device 10 to the new operating situation. The advantage of having the comparator 114 in the microcontroller 11 lies in the fact that the device 10 can be adapted to various propagation media just with modification of the software code (which may possibly be set even from outside), whereas a hardware comparator (made up of discrete components such as amplifiers, resistances, capacitors, etc.) would require a modification of the circuits in order to be adapted to the propagation medium.

The microcontroller 11 supplies at output, following upon the interrupt Vint, the vibration pulse VP to the vibration actuator 14. The vibration actuator 14 in this way identifies a user-feedback section 10F of the device 10.

In addition, the microcontroller 11, via further ports of its own, communicates by signal exchange with the acceleration sensor 13, supplying the setting parameters Ast and receiving from the acceleration sensor 13 an interrupt signal Aint, i.e., a signal indicating occurrence of a given condition, issued when the acceleration sensor 13 finds values that correspond to a given position of the foot 19, specifically a stable resting position. The acceleration sensor 13 in this way identifies a movement detection-section 10S of the device 10.

Preferably, given that a high-performance microprocessor 11 is used, like the aforementioned STM32, it is envisaged to disable the peripherals of the microprocessor 11 that are not being used and possibly to reduce the clock rate of the core of the microprocessor 11 so as to reduce energy consumption and increase autonomy of the device 10.

Figure 4:
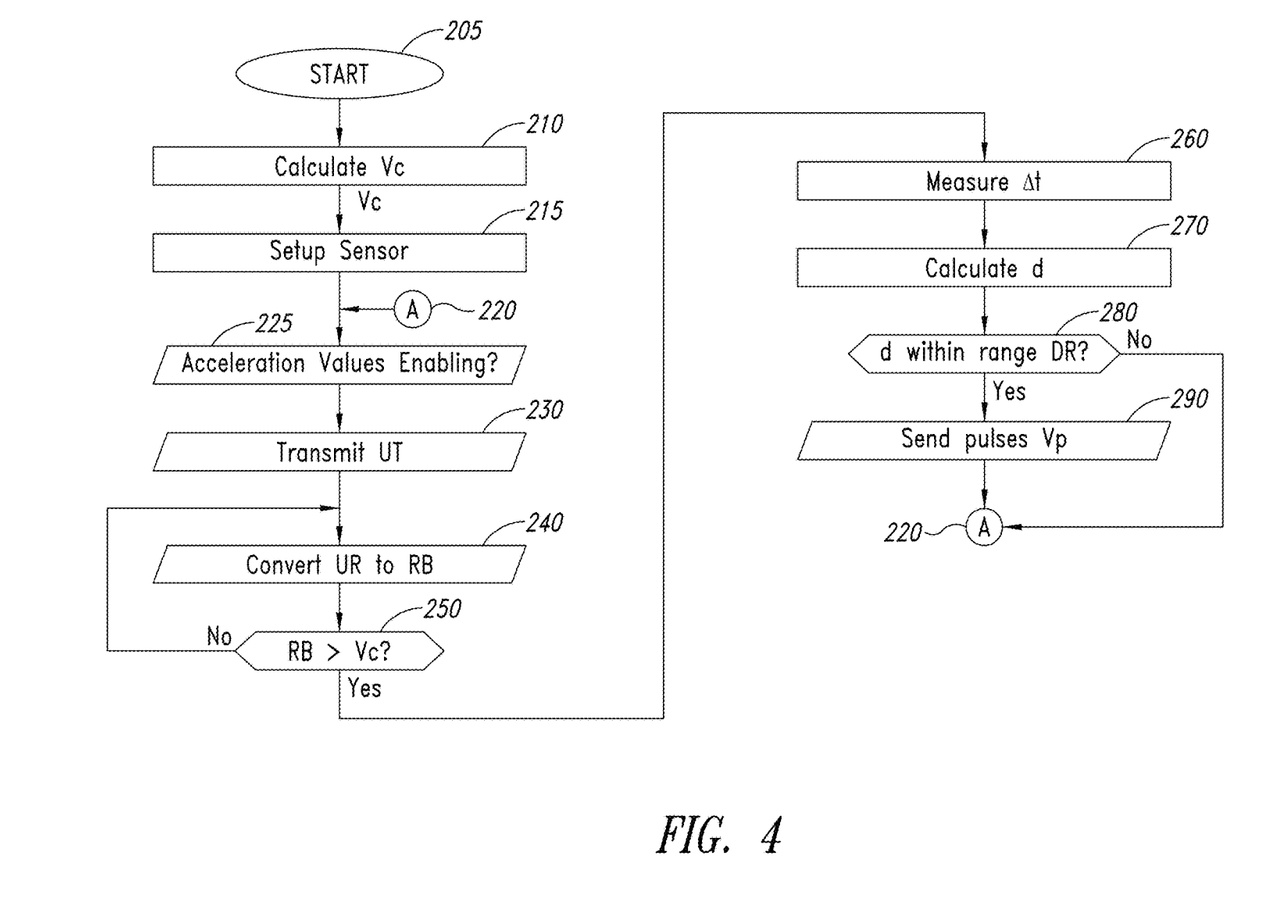
FIG. 4 shows a flowchart of an embodiment of a method for detecting obstacles used by the device of FIGS. 2 and 3.

Illustrated in FIG. 4 is an embodiment of a method 200 for obstacle detection that can be implemented by the obstacle-detection device 10 that has been described above.

In this context, the method starts in a step designated by the reference number 205, while the reference 210 designates an operation of calculation of the reference signal Vc, used as comparison threshold by the digital comparison module 114. This threshold is calculated as the product of the supply voltage VDD and a decreasing exponential function; hence the reference signal Vc is a voltage given by the following relation:

$$Vc = VDD e^{-t/K}$$

where K, as has been said, is the coefficient of propagation attenuation, usually for air, and t is time. Hence, following upon each enabling of measurement by the control module, the reference signal Vc starts from the value of the supply voltage VDD and decreases exponentially in time t.

The value of the reference signal or voltage Vc is calculated at given time intervals, for example every 100 μs. This value of the given time intervals is optimised to obtain the highest accuracy without overloading the microcontroller 11. In general, a vector is filled with the values of the reference signal Vc calculated at given time intervals; for example, the vector contains 100 values.

Once the value of the reference signal Vc has been calculated, in a subsequent step 215 an operation of setup of the sensor 13 is carried out by passing thereto the setting parameters Ast of the GPIO interface 112 and of the analog-to-digital converter 113. The setting parameters Ast have already been described previously; the sensor 13 is in any case set, for example by means of a Serial Peripheral Interface (SPI). The GPIO interface 112, in particular the ports GPIOA and GPIOC, is configured in such a way that the IN/OUT pins of these ports perform specific functions:

GPIOA PIN2=analog input, ADC input
GPIOA PIN3=digital output; it drives the warning module
GPIOC PIN0 and PIN1=digital outputs, control signal of the ultrasound transmitter.

The analog-to-digital converter 113 of the microprocessor, in particular the channel 12 of the ADC1 of the STM32, is configured, for example, in the following way: continuous conversion, 12-bit resolution.

Then, in a step 220 the acceleration values ax, ay, az, along the three directions or axes x, y, z are acquired by the acceleration sensor 13, and it is verified, in a step 225, whether these acceleration values ax, ay, az respect a given measurement-enabling condition Cen. In particular, this given enabling condition Cen comprises the fact that the variations of longitudinal acceleration ax and transverse acceleration ay, or in any case accelerations parallel to the resting surface 20, are zero (in the case of foot in the plane, also the acceleration values are substantially zero, whereas if the resting surface is inclined they may be constant, but other than zero) and that the variation of the vertical acceleration az is zero, but the acceleration az is substantially equal to the acceleration of gravity, i.e., 1 g. As already described, these are nominal conditions, whereas usually, via the use of a highpass filter, a threshold value for the absence of accelerations (for example, less than 80 g) is in actual fact respected. The aforesaid measurement-enabling condition Cen preferably corresponds to the position where the foot 19 has its sole, or the region of the sole where the transducer module 12 is located, resting on, and substantially parallel to, the resting surface 20, which, as has been said, may even be an inclined surface.

The sensor module 13, as described in greater detail in what follows, is preferably positioned at the forefoot; however, an enabling condition Cen based upon the absence of variations of acceleration is not very sensitive to positioning of the sensor 13 with respect to the sole of the foot.

Figure 5:
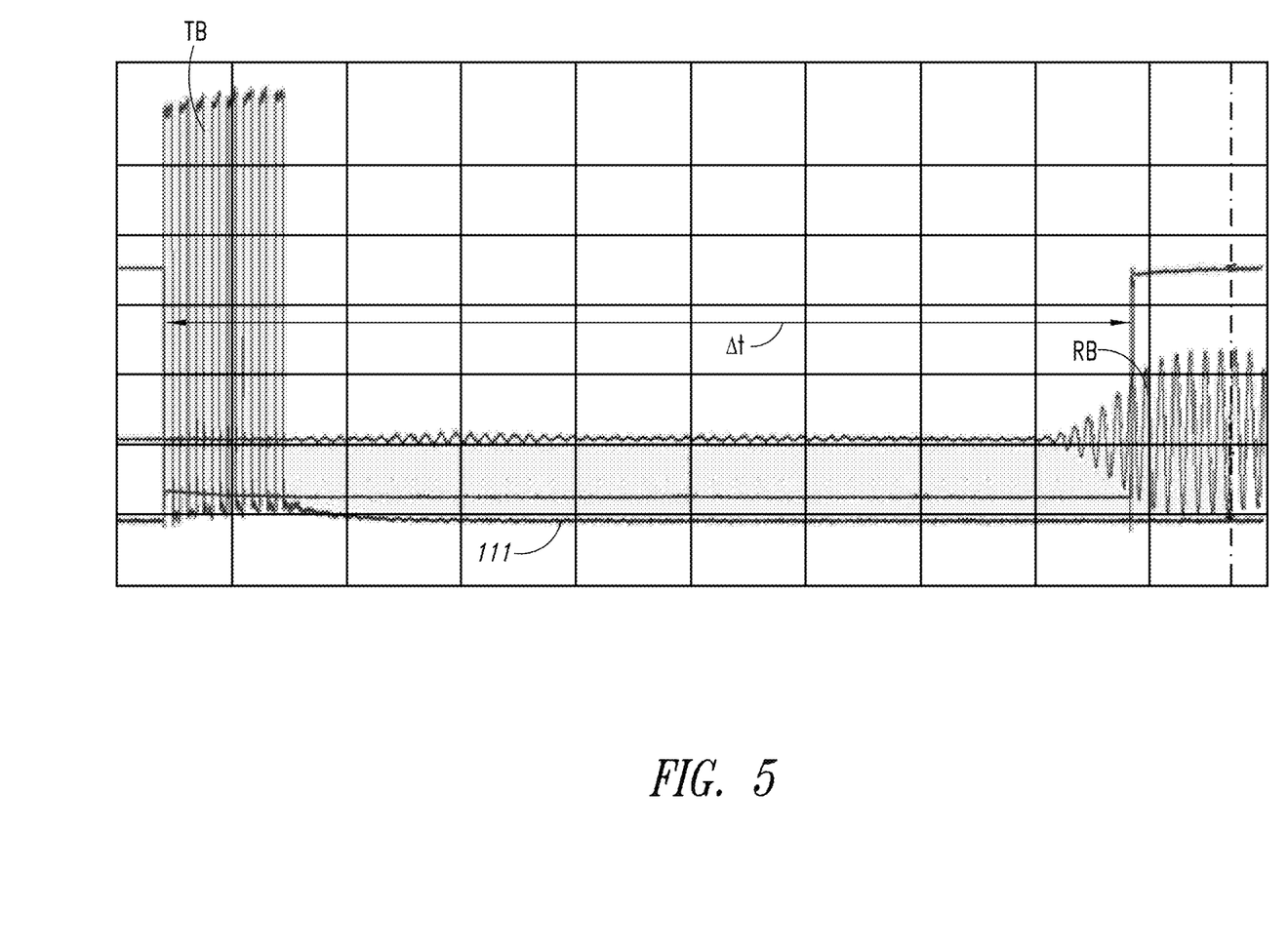
FIG. 5 and FIG. 6 show plots of signals used by the device and method of the previous figures.

If in step 225 occurrence of the enabling condition Cen for the accelerations ax, ay, az is verified, in a step 230 transmission of the ultrasound signal UT is started. In particular, a burst of eight 36-kHz pulses is issued as excitation signal RB (as illustrated in FIG. 5A), which also starts the timer 111 for measuring the times of flight Δt.

Next, in a step 240, the obstacle-detection device 10 awaits possible arrival of a reflected ultrasound signal UR, which is detected by the reception module 12R and presents as digital echo signal RB on the output of the analog-to-digital converter 113.

Figure 6:
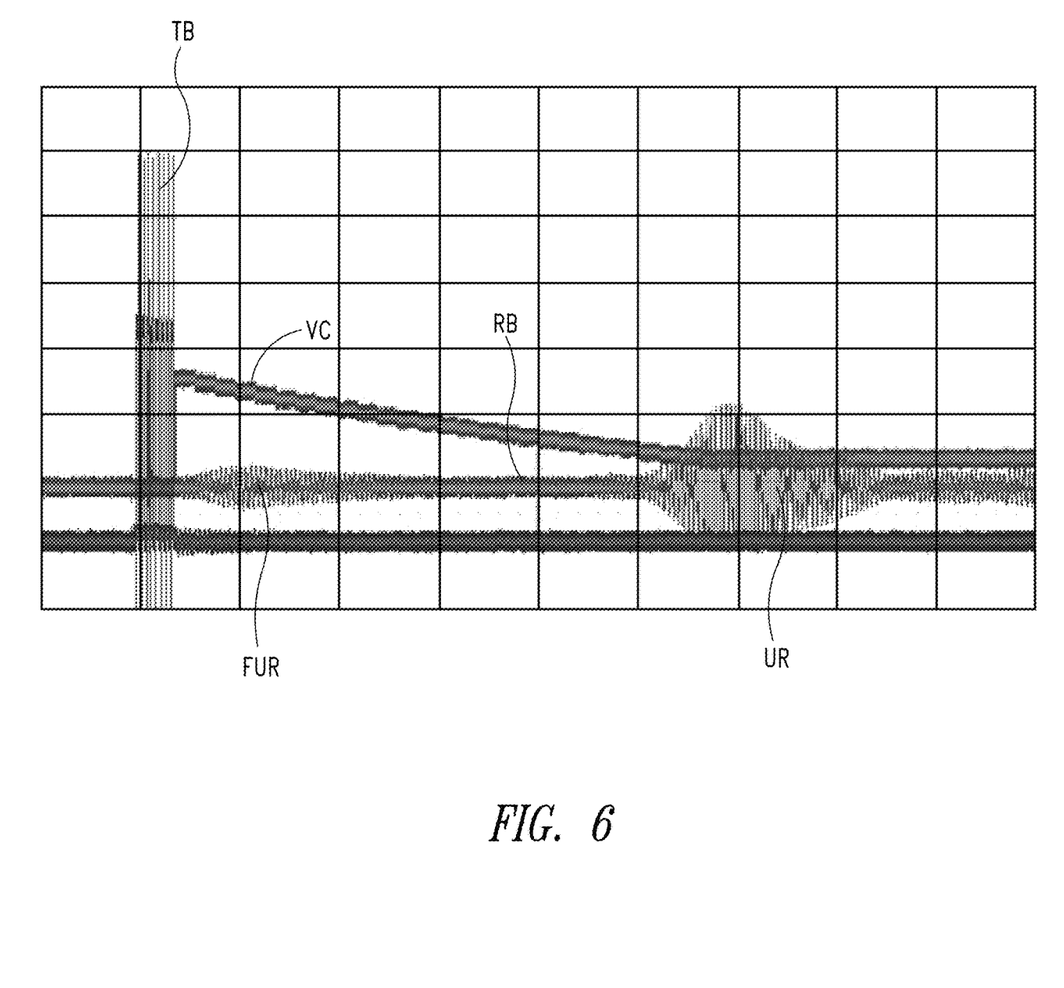

In a step 250, the amplitude of this echo signal RB is compared, by the comparator 114, with the amplitude of the reference signal Vc. If the amplitude of the echo signal RB is less than that of the reference signal Vc, control returns to step 240, awaiting a new echo signal RB. Instead, if the amplitude of the echo signal RB is greater than that of the reference signal Vc, as also illustrated in FIG. 6S, in a step 260 the microcontroller 11 stops the timer 111, thus carrying out measurement of the time of flight Δt corresponding to the given echo signal RB.

Then, in a step 270, the microcontroller 11 calculates the distance d of the obstacle 16, as product of the time of flight Δt and of the speed v of sound. The product is halved to take into account the to-and-fro journey of the wave UR reflected by the obstacle.

Then, in a step 280, a check is made to verify whether the value of the distance d falls within a given range of distance values DR, in particular for example a range DR comprised between 30 mm and 1000 mm. If it does not, control returns to step 220 of acquisition by the acceleration sensor 13 of the acceleration values ax, ay, az along the three directions or axes x, y, z, in general in order to identify a new step made by the user and arrival of the foot 19 into a new resting position.

If, instead, the distance d falls in the given range of distance values DR, the microcontroller 11 controls, in a step 290, the actuator 14 by sending vibration pulses VP at a frequency calculated proportionally to the value of the distance d measured. Control then in any case returns to step 220 for identifying a new step made by the user and possibly calculating a distance d, which presumably is now shorter; this distance d, in step 290, will determine a higher frequency of the vibration pulses VP, thus indicating to the user 18 that he or she is approaching the obstacle 16. Hence, in particular the microcontroller 11 generates as alarm signal a pulse train that increases its own frequency in a way inversely proportional to the distance detected d.

Represented in FIG. 5 is a time diagram of the excitation signal TB, of the signal of the timer 111, and of the echo signal RB. As may be seen, upon generation of the excitation signal RB of the timer 111, the latter is activated by the microcontroller 11, so that the corresponding signal passes from the high level to the low level to indicate activation of a pulse count. In particular, the timer 111 adds, taking into account possible prescalers or division factors, the clock ticks of the device since the aforesaid timer 111 has started. When the timer 111 is stopped, it makes the count available in an appropriate register. With the knowledge of the clock rate and hence of the period and the possible prescaler set, the time of flight Δt is calculated. Upon reception of the echo signal RB, when the amplitude of this excitation signal RB exceeds a given value, corresponding to the voltage of the reference signal Vc, the microcontroller 11 stops the timer 111 so that the corresponding signal passes to the high level, thus stopping the count and identifying, with the length of the period at low level counted, the time of flight Δt.

In FIG. 5 the time base is 100 µs per division, and hence the time of flight Δt is 748 µs, corresponding to a distance d of 250 mm.

As mentioned previously, the reference signal Vc, or reference threshold voltage, of the comparator module 114 is preferably an exponential function decreasing in time multiplied by the supply voltage VDD. The aforesaid reference signal Vc is indicated in FIG. 6, together with the echo signals RB. The attenuation coefficient K determines the speed of the exponential decrease of the value of the reference threshold voltage Vc. The use of a reference signal Vc the value of which drops exponentially in time prevents any possible spurious signals (designated by FUR in FIG. 6) due to the proximity of the transmitter 12T and of the receiver 12T, or else due to multiple echoes of the ultrasound signals transmitted during previous steps that were to reach the module 12R before the correct ultrasound signal UR. In fact, as may be seen in FIG. 6, the reference signal Vc initially has a very high value and then tends asymptotically to an offset value. This offset value is preferably set as a function of the range of variation of the voltages generated by the AFE circuit 12A. Of course, in various embodiments it is also possible to use a reference signal Vc that determines a constant-value reference threshold.

Hence, immediately after transmission, the threshold Vc set on the comparator is as high as possible, and any possible reflections or cross-talk do not have an amplitude sufficient for bringing about switching of the comparator 114. An echo coming from an obstacle that is nearby and set in front of the user has, with a fair level of confidence, an amplitude sufficient to cause switching of the comparator 114. A lateral obstacle that reflects the ultrasounds transmitted in the direction of the receiver 12R barely manages to generate an echo of amplitude sufficient to cause switching of the comparator 114. After transmission, the value of the reference signal Vc of the comparator 114 is updated at a given rate, for example every 100 µs, with the exponentially decreasing calculated values, to take into account the fact that the signal reflected undergoes an attenuation proportional to the path covered by the ultrasound waves.

With signals like the ones illustrated in FIGS. 5 and 6 it is possible to obtain a spatial resolution of approximately 1 cm, in a range of variation of the distance DR of approximately 1 m and a minimum distance detected of 30 mm.

The device 10 presents in any case contained consumption levels, for example the consumption ranging between a minimum of 30 mA in continuous transmission of ultrasounds without obstacles and a maximum of 70 mA when in addition the feedback is sent through the vibration actuator 14.

Figure 7:
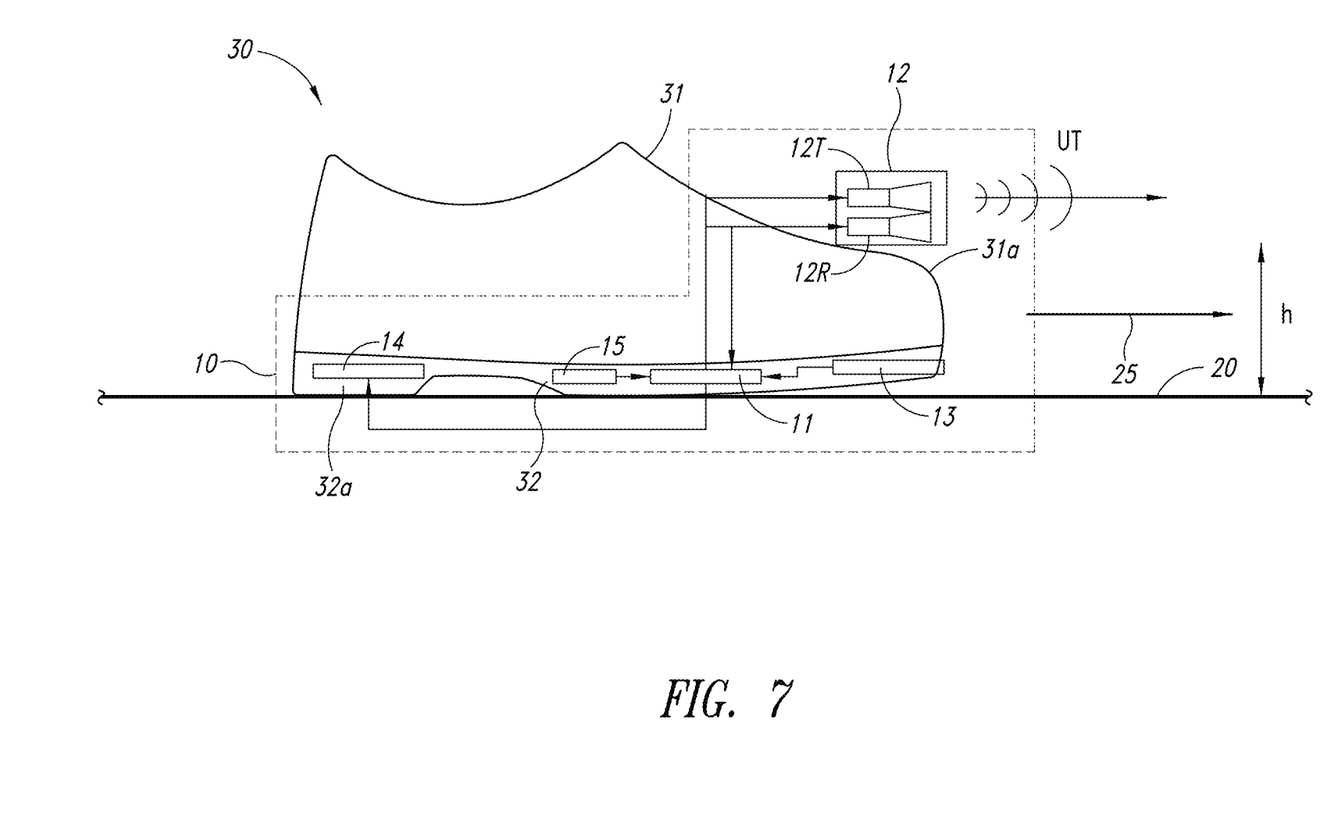
FIG. 7 shows the device of FIGS. 2 and 3 integrated in an item of footwear.

Illustrated in FIG. 7 is the implementation of the obstacle-detection device 10 in an item of footwear 30. The ultrasound transducer module 12, comprising the transmission module 12T and the reception module 12R, positioned in the proximity, is located on the top part of the toe 31a of an upper 31 of the item of footwear 30 so as to send the ultrasound transmission signals UT in a forward direction 25 of the subject 18, at a height h, with respect to the resting surface 20, such as not to detect obstacles of small dimensions, for example, small stones with a diameter less than the height at which the ultrasound transducer module 12 is positioned with respect to the resting surface 20. It is clear that in various embodiments the ultrasound transducer module 12 may be positioned in different points of the upper 31 and at different heights, according to the different desires of detection and design.

The item of footwear 30 comprises a sole 32, in which the remaining modules of the obstacle-detection device 10 are arranged. In particular, the acceleration sensor 13 is set in the sole 32 in a position vertically corresponding to the position of the ultrasound transducer module 12. The sole 32 also houses the microprocessor 11, which is associated to the battery 15 for its supply, the battery also being located in the sole 32. Also the vibration actuator 14 is preferably located in the sole 32, in the example illustrated in a position corresponding to a heel portion 32a of the sole 32, so that the sole 32 can integrate all the modules of the device 10 except for the ultrasound transducer module 12.

In various embodiments, the sole 32 may, for example in its front part underlying the toe 31a of the item of footwear 30, also integrate the aforesaid ultrasound transducer module 12.

In various embodiments, the vibration actuator 14 may be set in the upper 31 or in other parts of the item of footwear 30. In various embodiments, each of the modules 11, 12, 13, 14 and 15 of the device 10 may be set in the sole 32 or in the upper 31, or else, wherever suitable for the function of the specific module, in some other part of the item of footwear 30 or in any other piece of clothing or other wearable object.

Hence, from the description the advantages of the solution described emerge clearly.

The obstacle-detection device and the corresponding method described enable precise measurement of the distance from the obstacle as the wearer advances, without being affected by the different orientations assumed by the direction of emission of the ultrasound signals in so far as the measurement is made only in one given condition of reliability for measurement of the time of flight, specifically when the foot rests on the ground during the walk.

The obstacle-detection device and the corresponding method described herein moreover enable supply of a feedback to the user through an alarm signal, preferably a vibrational or tactile signal, in particular one that depends upon the distance of the user from the obstacle. This is particularly advantageous for use by people who are blind or suffer from weak eyesight.

The obstacle-detection device and the corresponding method described moreover use a dedicated electronics for making the measurement, which rules out, for example, the possibility of false positives due to spurious signals. In particular, thanks to the variable threshold of the comparator it is possible to discriminate possible reflections of the transmitted ultrasounds by the resting surface or by lateral obstacles or any possible cross-talk between the ultrasound transmitter and the ultrasound receiver.

Of course, without prejudice to the principle of the disclosure, the details and the embodiments may vary, even considerably, with respect to what has been described purely by way of example herein, without departing from the sphere of protection.

In variant embodiments, instead of the GPIO interface 112 of the microcontroller 11 for the transmission section 10T, an external driving device, suitable for driving the ultrasound transducer module 12, may be used to obtain a higher power and increase the range of the obstacle-detection device.

In variant embodiments, the transducer module 12 may use a single transducer, which switches between the function of transmission and that of reception so as to present more contained dimensions and improve integration.

In variant embodiments, the enabling condition, with detection of the position of the foot, may envisage, instead of fixed values, carrying out a continuous reading of the acceleration values along the three axes and identifying, via processing starting from the evolution in time of the acceleration values on the three axes, the temporal region corresponding to the foot resting on the ground or, in any case, corresponding to a reliable condition of measurement of the time of flight. In variant embodiments, the solution described herein may also be extended to conditions where the user is running in which there can be identified regions of stability for making measurements using inertial sensors, in particular accelerometers.

In various embodiments, the battery may be replaced or accompanied by an energy-harvesting system provided in the item of footwear or specifically in the sole, for recovery of energy from the movement of the foot.

The components of the device may be laid out on a printed circuit board (PCB), in particular a flexible PCB, in order to improve integration in the item of footwear.

In various embodiments, the microcontroller may receive, instead of an interrupt signal, the values measured by the acceleration sensor and verify autonomously whether these values respect the enabling condition.

In various embodiments, the obstacle-detection device can be worn on the foot without integration in a specific item of footwear by providing a supporting structure for the modules of the device, which can be applied directly on the foot or else to a sock.

In general, the device as claimed may be associated to any supporting structure suited to supporting the elements of the detection device itself so as to preserve the functions thereof, as described and claimed.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A device for detecting obstacles that is wearable by a subject, said device comprising:
an ultrasound source configured to emit an ultrasound transmission signal;
an ultrasound receiver configured to receive a corresponding ultrasound reflected signal reflected by an obstacle;
a control module configured to measure a time of flight between emission of the ultrasound transmission signal by the ultrasound source and reception of the reflected ultrasound signal by the ultrasound receiver and calculate, based on said time of flight, a distance at which said obstacle is located; and
an acceleration sensor configured to measure acceleration values of the subject along three axes, respectively; and
wherein the control module is configured to enable operation of the ultrasound source and enable measurement of the time of flight in response to determining that said acceleration values measured by said acceleration sensor indicate that a foot of the subject is resting on a resting surface during a walk.

2. The device according to claim 1, wherein the control module is configured to enable operation of the ultrasound source and enable measurement of the time of flight in response to determining that a longitudinal acceleration and/or a lateral acceleration are zero or constant and a vertical acceleration is equal to the acceleration of gravity.

3. The device according to claim 1, wherein the control module includes components that define a measurement chain configured to measure the time of flight between emission of the ultrasound transmission signal and reception of the ultrasound reflected signal and calculate, based on said time of flight, the distance at which said obstacle is located, said measurement chain including a time-gain-compensation section.

4. The device according to claim 3, wherein said time-gain-compensation section includes a comparator configured to compare an amplitude of the ultrasound reflected signal with a reference signal.

5. The device according to claim 4, wherein said reference signal decreases over time, following upon each enabling of measurement by the control module, according to a decreasing exponential, as a function of a propagation attenuation of a medium in which the ultrasound waves of the ultrasound transmission signal propagate.

6. The device according to claim 1, wherein said acceleration sensor is configured to verify that said acceleration values measured by said acceleration sensor indicate that the foot of the subject is resting on the resting surface during the walk and send an interrupt signal, indicating that the foot is resting on the resting surface, to a microcontroller implementing said control module, said microcontroller being configured to enable operation of the ultrasound source upon reception of said interrupt signal.

7. The device according to claim 1, further comprising an alarm indicator configured to generate an alarm signal when said distance of the obstacle detected falls within a given range of distances.

8. The device according to claim 7, wherein said alarm indicator is configured to vary said alarm signal as a function of the distance from the obstacle.

9. The device according to claim 1, wherein the ultrasound source, ultrasound receiver, control module, acceleration sensor, and control module are integrated in an item of footwear and said acceleration sensor is integrated in a sole of said item of footwear.

10. A method, comprising:
   detecting an obstacle via a device for detecting obstacles that is wearable by a subject, the detecting including:
      emitting ultrasounds from an ultrasound source and receiving ultrasounds reflected from the obstacle,
      measuring a time of flight between said emitting and said receiving,
      calculating, based on said time of flight, a distance at which said obstacle is located,
      measuring acceleration values of the subject along three axes, and
      enabling operation of the ultrasound source in response to determining that said measured acceleration values indicate that a foot of the subject is resting on a resting surface during a walk.

11. The method according to claim 10, comprising generating an alarm signal in response to determining that said distance detected falls within a given range of distances.

12. A non-transitory computer readable medium including program code that, when run on at least one computer, implement a method comprising:
   detecting an obstacle via a device for detecting obstacles that is wearable by a subject, the detecting including:
      measuring a time of flight between an ultrasound source of said the device emitting ultrasounds and receiving ultrasounds reflected from the obstacle,
      calculating, based on said time of flight, a distance at which said obstacle is located,
      measuring acceleration values of the subject along three axes, and
      enabling operation of the ultrasound source in response to detecting that said measured acceleration values indicate that a foot of the subject is resting on a resting surface during a walk.

13. The non-transitory computer readable medium according to claim 12, wherein the method includes causing an alarm indicator to generate an alarm signal in response to determining that said distance detected falls within a given range of distances.

14. The non-transitory computer readable medium according to claim 13, wherein said alarm indicator varies said alarm signal as a function of the distance from the obstacle.

15. The non-transitory computer readable medium according to claim 12, wherein detecting that said measured acceleration values indicate that the foot of the subject is resting on the resting surface includes determining that a longitudinal acceleration and/or a lateral acceleration are zero or constant and that a vertical acceleration that is equal to the acceleration of gravity.

16. The non-transitory computer readable medium according to claim 12, wherein detecting that said measured acceleration values indicate that the foot of the subject is resting on the resting surface is performed by an inertial sensor that sends an interrupt signal, indicating that the foot of the subject is resting on the resting surface, to a microcontroller that enables operation of the ultrasound source upon reception of said interrupt signal.

17. The method according to claim 11, wherein said alarm indicator varies said alarm signal as a function of the distance from the obstacle.

18. The method according to claim 10, wherein detecting that said measured acceleration values indicate that the foot of the subject is resting on the resting surface includes determining that a longitudinal acceleration and/or a lateral acceleration are zero or constant and that a vertical acceleration that is equal to the acceleration of gravity.

19. The method according to claim 10, wherein detecting that said measured acceleration values indicate that the foot of the subject is resting on the resting surface is performed by an inertial sensor that send an interrupt signal, indicating that the foot of the subject is resting on the resting surface, to a microcontroller that enables operation of the ultrasound source upon reception of said interrupt signal.

* * * * *